United States Patent
Duman

(10) Patent No.: US 9,973,073 B2
(45) Date of Patent: May 15, 2018

(54) VOLTAGE CONVERSION DEVICE THAT ENSURES SUPPLY OF POWER TO A CONTROLLER EVEN IF THE INPUT VOLTAGE DECREASES

(71) Applicant: Emre Duman, Aichi (JP)

(72) Inventor: Emre Duman, Aichi (JP)

(73) Assignee: OMRON AUTOMOTIVE ELECTRONICS CO., LTD., Aichi (JP)

( * ) Notice: Subject to any disclaimer, the term of this patent is extended or adjusted under 35 U.S.C. 154(b) by 0 days. days.

(21) Appl. No.: 15/684,297

(22) Filed: Aug. 23, 2017

(65) Prior Publication Data
US 2018/0062500 A1 Mar. 1, 2018

(30) Foreign Application Priority Data

Aug. 24, 2016 (JP) .................................. 2016-163636

(51) Int. Cl.
*H02M 1/08* (2006.01)
*H02M 3/335* (2006.01)
*H02M 1/00* (2006.01)

(52) U.S. Cl.
CPC ......... *H02M 1/08* (2013.01); *H02M 3/33569* (2013.01); *H02M 2001/0006* (2013.01)

(58) Field of Classification Search
CPC .................. H02M 1/08; H02M 2001/0006
See application file for complete search history.

(56) References Cited

U.S. PATENT DOCUMENTS

| | | | | |
|---|---|---|---|---|
| 6,064,580 A | * | 5/2000 | Watanabe | H02M 3/33592 363/127 |
| 6,778,410 B2 | * | 8/2004 | Zeng | H02M 3/33592 363/16 |

(Continued)

FOREIGN PATENT DOCUMENTS

| JP | 2002315324 A | 10/2002 |
|---|---|---|
| JP | 2002354814 A | 12/2002 |

(Continued)

OTHER PUBLICATIONS

Shuai Jiang et al.; "Grid Connected Boost-Half-Bridge Photovoltaic Micro Inverter System Using Repetitive Current Control and Maximum Power Point Tracking", 2012 Twenty-Seventh Annual IEEE Applied Electronics Conference and Exposition (APEC), pp. 590-597; Feb. 5-9, 2012 (8 pages).

(Continued)

*Primary Examiner* — Yusef A Ahmed
(74) *Attorney, Agent, or Firm* — Osha Liang LLP

(57) ABSTRACT

A voltage conversion device includes a first conversion circuit configured to switch a DC voltage at a DC power supply to convert the DC voltage into an AC voltage, a second conversion circuit configured to rectify the AC voltage converted with the first conversion circuit to convert the AC voltage into a DC voltage, a controller configured to control switching operation of the first conversion circuit, and emergency power supply circuits (a clamp circuit and a constant-voltage circuit) provided between a connection point of an auxiliary switching element and a capacitor and the controller. When an input voltage at the DC power supply decreases due to start-up of a starter motor in releasing idling stop of a vehicle, the emergency power supply circuits obtain a power supply voltage necessary for (Continued)

operation of the controller from a voltage at the connection point, and supply the power supply voltage to the controller.

7 Claims, 13 Drawing Sheets

(56) References Cited

U.S. PATENT DOCUMENTS

| | | | | |
|---|---|---|---|---|
| 8,847,512 | B1* | 9/2014 | Xiong | H05B 41/295 |
| | | | | 315/244 |
| 2002/0000923 | A1* | 1/2002 | Nishikawa | H02M 3/33569 |
| | | | | 341/22 |
| 2008/0074905 | A1* | 3/2008 | Moiseev | H02M 3/33584 |
| | | | | 363/20 |
| 2010/0246215 | A1* | 9/2010 | Mase | H02M 1/36 |
| | | | | 363/21.04 |
| 2011/0026276 | A1* | 2/2011 | Nakahori | H02M 1/4258 |
| | | | | 363/21.04 |
| 2011/0051467 | A1* | 3/2011 | Nakanishi | H02M 3/337 |
| | | | | 363/21.02 |
| 2012/0153729 | A1* | 6/2012 | Song | H02J 7/0013 |
| | | | | 307/82 |
| 2012/0163035 | A1 | 6/2012 | Song et al. | |
| 2013/0294114 | A1* | 11/2013 | Nakanishi | H02M 3/33569 |
| | | | | 363/21.01 |
| 2014/0268908 | A1 | 9/2014 | Zhou et al. | |
| 2015/0092453 | A1* | 4/2015 | Ohtake | H02M 3/33507 |
| | | | | 363/21.02 |
| 2015/0109829 | A1* | 4/2015 | Usami | H02M 1/126 |
| | | | | 363/17 |
| 2016/0248332 | A1* | 8/2016 | Ohtake | H02M 3/33546 |

FOREIGN PATENT DOCUMENTS

| | | |
|---|---|---|
| JP | 2003092876 A | 3/2003 |
| JP | 2003092877 A | 3/2003 |
| JP | 2003092881 A | 3/2003 |
| JP | 2007189835 A | 7/2007 |
| JP | 2007236155 A | 9/2007 |
| JP | 2007236156 A | 9/2007 |
| JP | 2008079454 A | 4/2008 |
| JP | 2010226931 A | 10/2010 |

OTHER PUBLICATIONS

Dong Cao et al.; "Low Cost Transformer Isolated Boost Half-bridge Micro-inverter for Single-phase Grid-connected Photovoltaic System", 2012 Twenty-Seventh Annual IEEE Applied Power Electronics Conference and Exposition (APEC), pp. 71-78; Feb. 5-9, 2012 (8 pages).

Hossein Tahmasebi; "Boost Integrated High Frequency Isolated Half-Bridge DC-DC Converter: Analysis, Design, Simulation and Experimental Results", 2015 A Project Report Submitted in Partial Fulfillment of the Requirements for the Degree of Master of Engineering, University of Victoria; https://dspace.library.uvic.ca/bitstream/handle/1828/6427/Tahmasebi_Hossein_MEng_2015.pdf (74 pages).

John Benson York, Jr.; "An Isolated Micro-Converter for Next Generation Photovoltaic Infrastructure", Dissertation submitted to the Faculty of the Virginia Polytechnic Institute and State University; https://vtechworks.lib.vt.edu/bitstream/handle/10919/19326/York_JB_D_2013.pdf; Apr. 19, 2013 (187 pages).

Changwoo Yoon et al.; "Multi-Phase DC-DC converters using a Boost Half Bridge Cell for High Voltage and High Power Applications", Seoul National University of Technology, IEEE proceedings; pp. 780-786; 2006 (7 pages).

* cited by examiner

FIG. 2A  Vgs2 (S2 gate signal)

FIG. 2B  Vgs1 (S1 gate signal)

$$Vc1 = \frac{D}{1-D} Vin$$

$$Vc2 = Vin$$

$$Vm = Vc1 + Vc2 = \frac{1}{1-D} Vin$$

$$Vc3 = \frac{D}{1-D} Vin * N$$

$$Vc4 = Vin * N$$

$$Vo = Vc3 + Vc4 = \frac{1}{1-D} Vin * N$$

FIG. 5A
Section A (t0 - t1)
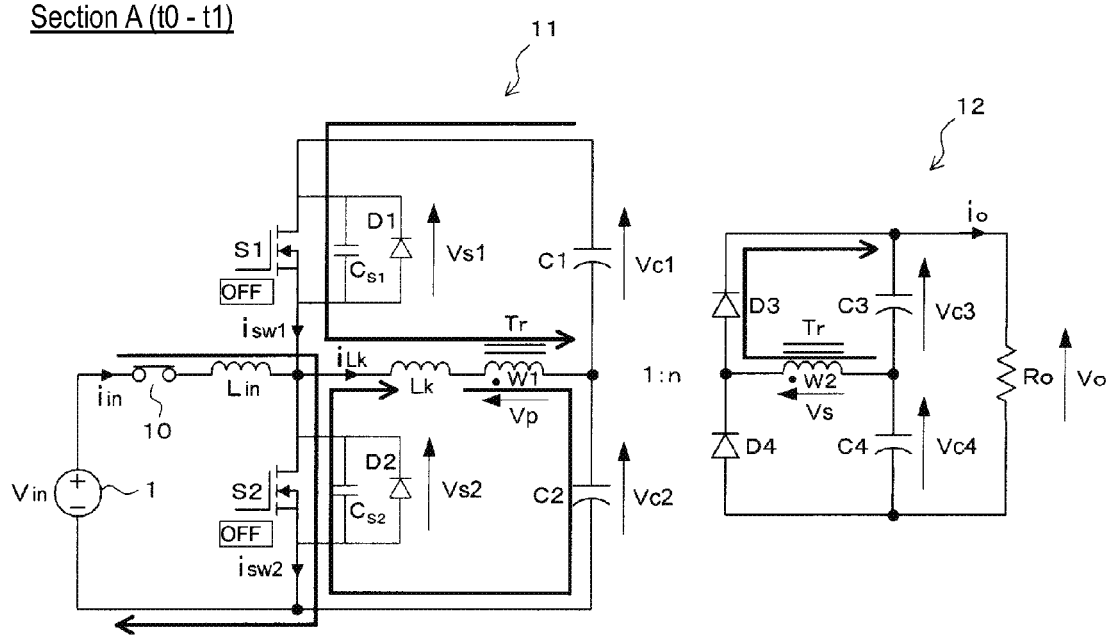
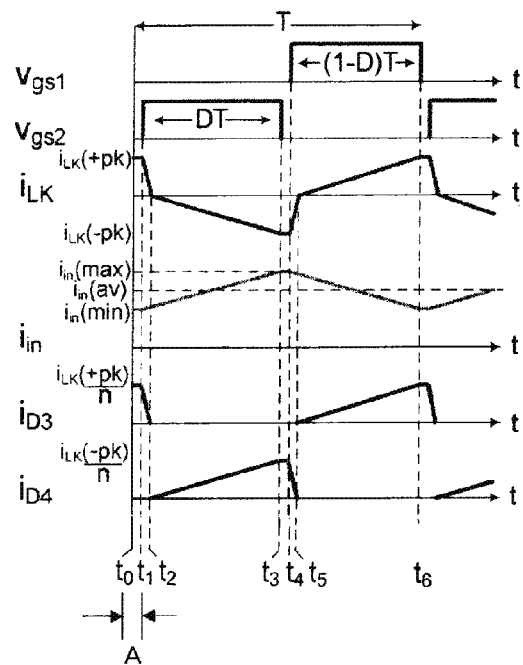

FIG. 5B
Section B (t1 - t2)
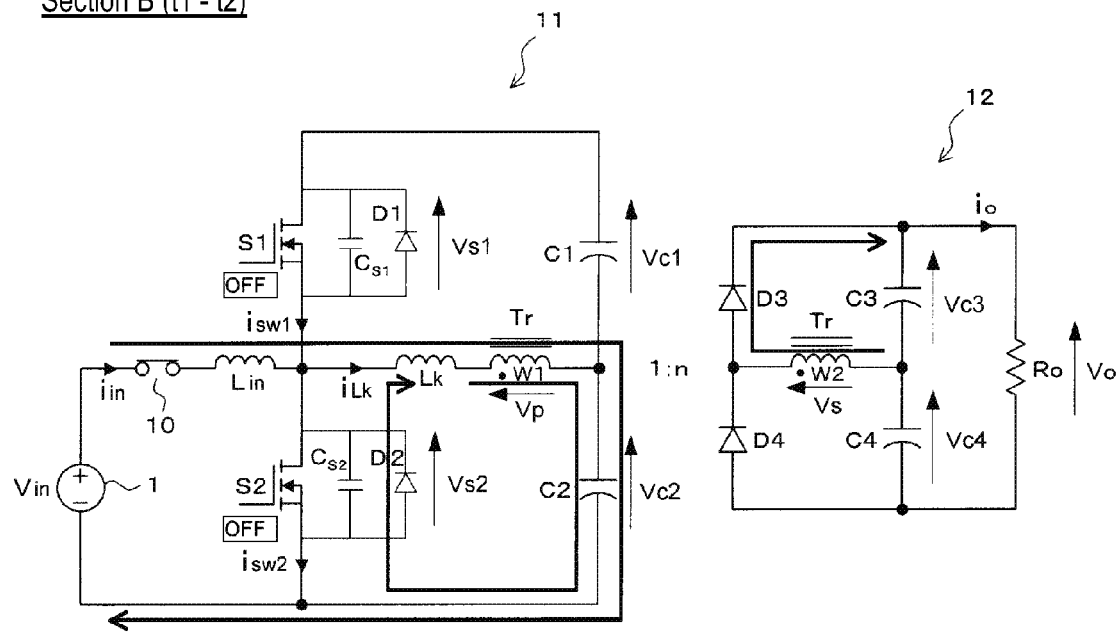
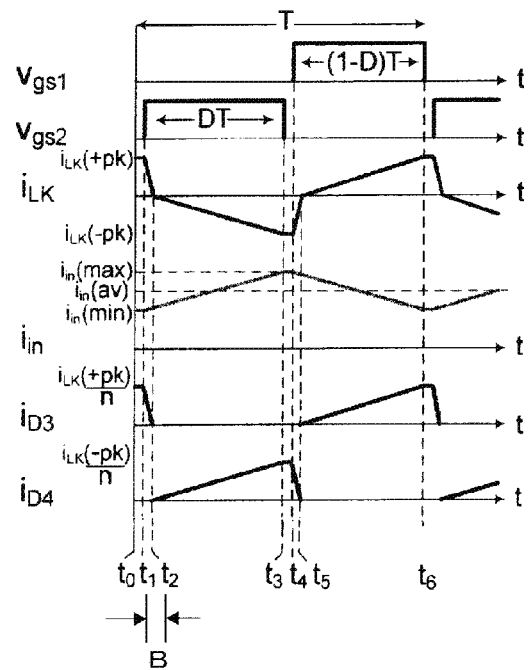

FIG. 5C
Section C (t2 - t3)
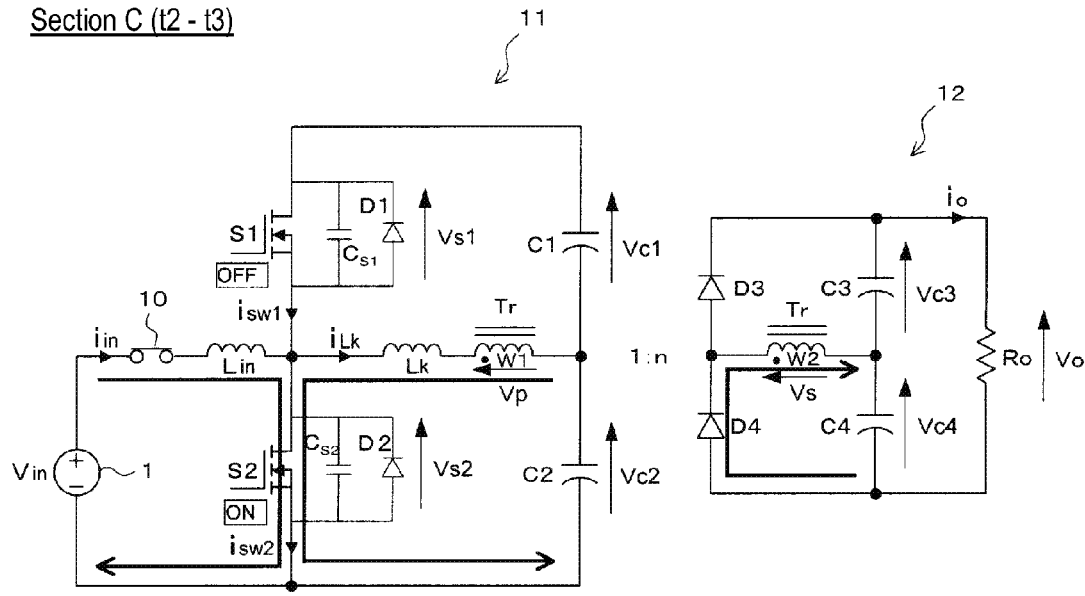
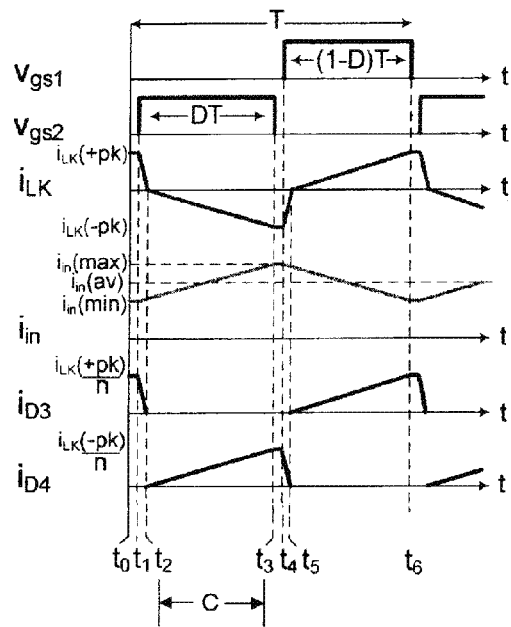

FIG. 5D
Section D (t3 - t4)
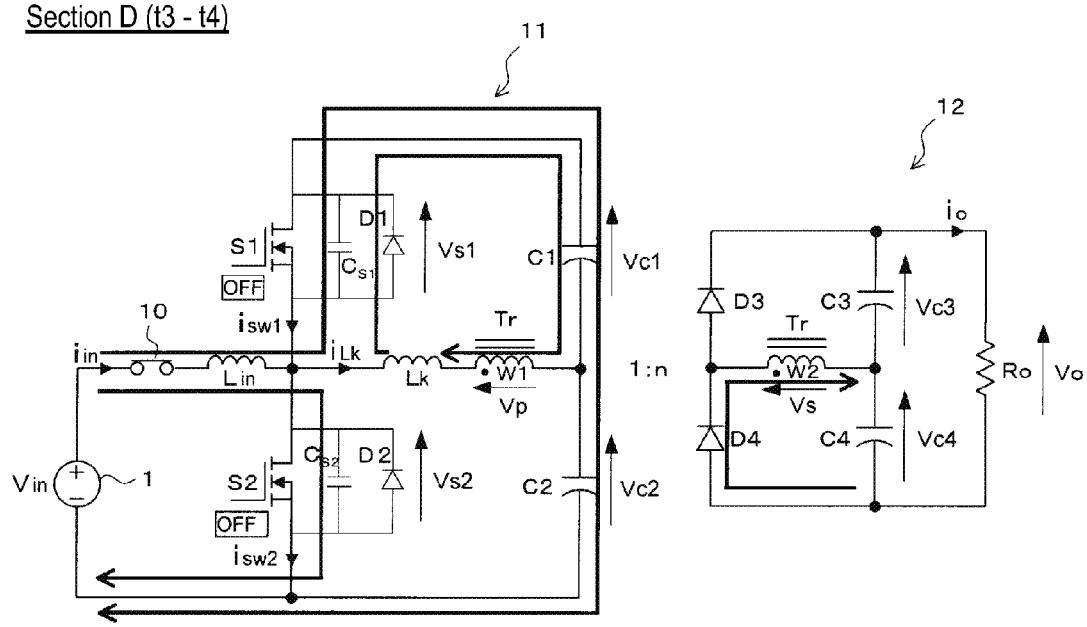
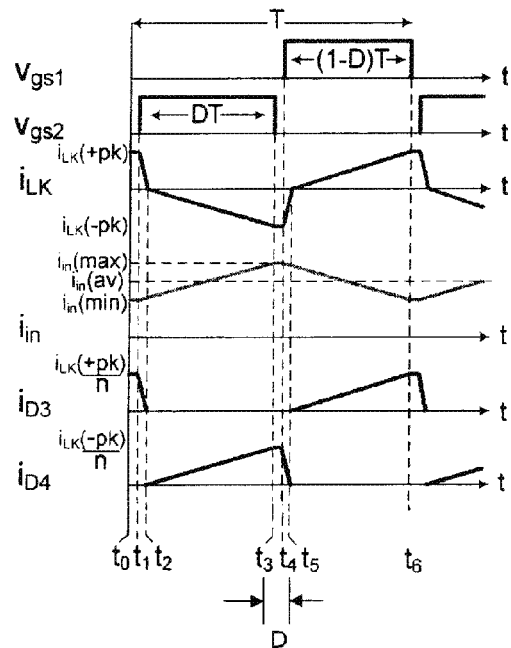

FIG. 5E
Section E (t4 - t5)
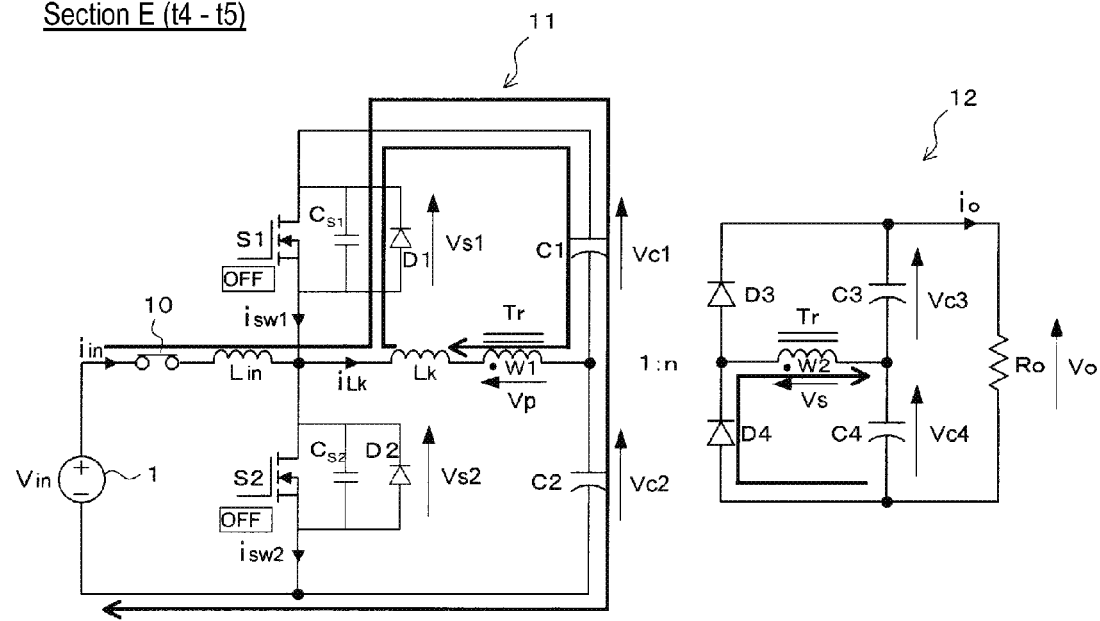
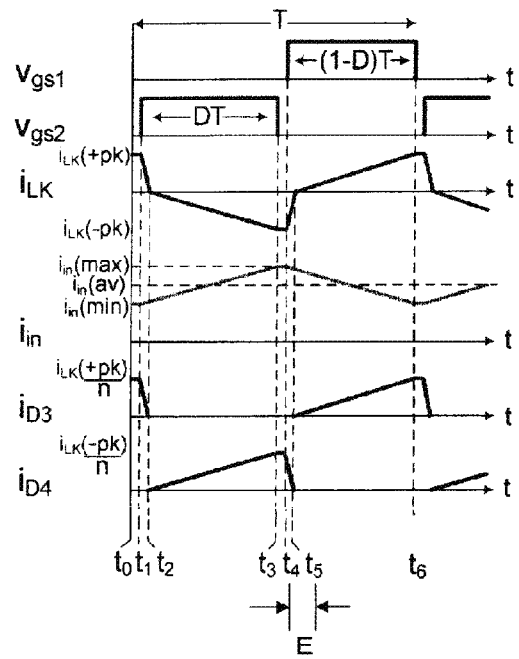

FIG. 5F
Section F (t5 - t6)
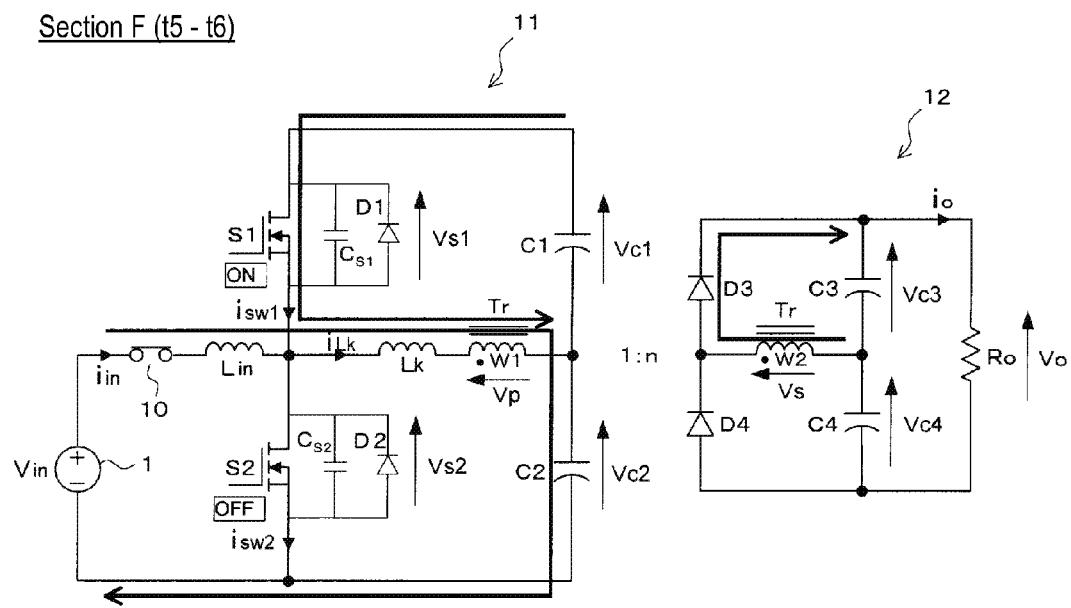
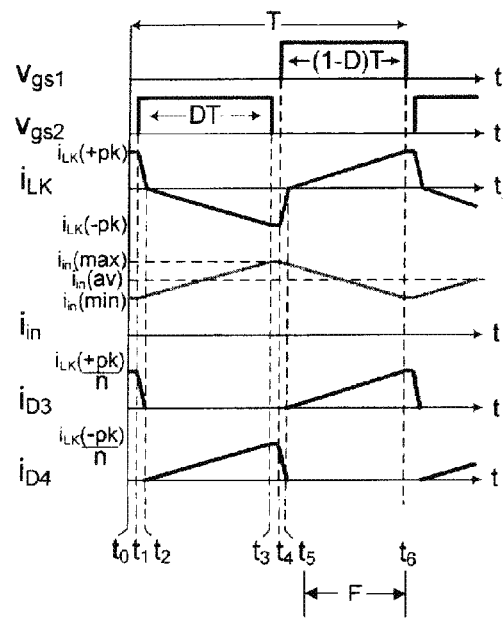

Normal power supply route

VOLTAGE CONVERSION DEVICE THAT ENSURES SUPPLY OF POWER TO A CONTROLLER EVEN IF THE INPUT VOLTAGE DECREASES

CROSS-REFERENCE TO RELATED APPLICATION

This application is based on Japanese Patent Application No. 2016-163636 filed with the Japan Patent Office on Aug. 24, 2016, the entire contents of which are incorporated herein by reference.

FIELD

The disclosure relates to a voltage conversion device such as a DC-DC converter, particularly to a technology of ensuring supply of power to a controller of the voltage conversion device when an input voltage decreases.

BACKGROUND

For example, in an insulation type DC-DC converter in which an input side and an output side are insulated from each other, a first conversion circuit that converts a DC voltage of a DC power supply into an AC voltage by switching of the DC voltage is provided on the input side, and a second conversion circuit that converts the AC voltage converted with the first conversion circuit into a DC voltage by rectification of the AC voltage is provided on the output side. The first conversion circuit and the second conversion circuit are insulated from each other using a transformer.

There are insulation type DC-DC converters called a boost half bridge system (hereinafter, referred to as a BHB system) in which a boosting chopper (boost converter) and a half bridge type DC-DC converter are combined. U.S. Patent Publication No. 2014/0268908 (Patent Literature 1), Unexamined Japanese Patent Publication No. 2002-315324 (Patent Literature 2), Unexamined Japanese Patent Publication No. 2003-92876 (Patent Literature 3), Unexamined Japanese Patent Publication No. 2003-92877 (Patent Literature 4), Unexamined Japanese Patent Publication No. 2003-92881 (Patent Literature 5), Unexamined Japanese Patent Publication No. 2007-189835 (Patent Literature 6), Unexamined Japanese Patent Publication No. 2007-236155 (Patent Literature 7), Unexamined Japanese Patent Publication No. 2007-236156 (Patent Literature 8), Unexamined Japanese Patent Publication No. 2008-79454 (Patent Literature 9), Unexamined Japanese Patent Publication No. 2010-226931 (Patent Literature 10), and Unexamined Japanese Patent Publication No. 2002-354814 (Patent Literature 11), Shuai Jiang, Dong Cao, Fang Z. Peng and Yuan Li "Grid-Connected Boost-Half-Bridge Photovoltaic Micro Inverter System Using Repetitive Current Control and Maximum Power Point Tracking", 5-9 Feb. 2012, 2012 Twenty-Seventh Annual IEEE Applied Power Electronics Conference and Exposition (APEC), pp. 590-597 (Non Patent Literature 1), Dong Cao, Shuai Jiang, Fang Z. Peng and Yuan Li "Low Cost Transformer Isolated Boost Half-bridge Micro-inverter for Single-phase Grid-connected Photovoltaic System", 5-9 Feb. 2012, 2012 Twenty-Seventh Annual IEEE Applied Power Electronics Conference and Exposition (APEC), pp. 71-78 (Non Patent Literature 2), Hossein Tahmasebi, "Boost Integrated High Frequency Isolated Half-Bridge DC-DC Converter: Analysis, Design, Simulation and Experimental Results", 2015 A project Report Submitted in Partial Fulfillment of the Requirements for the Degree of MASTER OF ENGINEERING, University of Victoria (https://dspace.library.uvic.ca/bitstream/handle/1828/6427/Tahmasebi_Hossein_MEng_2015.pdf) (Non Patent Literature 3), and York Jr, John Benson, "An Isolated Micro-Converter for Next-Generation Photovoltaic Infrastructure" 2013-04-19 Dissertation submitted to the Faculty of the Virginia Polytechnic Institute and State University (https://vtechworks.lib.vt.edu/bitstream/handle/10919/19326/York_JB_D_2013.p df) (Non Patent Literature 4) disclose BHB-system insulation type DC-DC converters.

In the BHB-system insulation type DC-DC converter, a main switching element, an auxiliary switching element, an inductor, a primary winding of a transformer, and two capacitors are provided in the input-side first conversion circuit. The inductor and the main switching element are connected in series to the DC power supply, and a series circuit of the primary winding of the transformer and one of the capacitors is connected in parallel to the main switching element. A series circuit of the other capacitor and the auxiliary switching element is connected in parallel to the primary winding of the transformer.

For example, a circuit including two rectifying elements, two capacitors, and a secondary winding of a transformer as illustrated in FIG. 11 of Patent Literature 1 or a circuit including two rectifying elements, one capacitor, one inductor, and a secondary winding of a transformer having a center tap as illustrated in FIG. 1 of Patent Literature 2 is provided in the output-side second conversion circuit.

The main switching element and auxiliary switching element of the first conversion circuit are alternately turned on with a predetermined duty. The auxiliary switching element is turned off in a period in which the main switching element is turned on, and the main switching element is turned off in a period in which the auxiliary switching element is turned on. When the main switching element is turned on, the voltage at one of the capacitors is applied to the primary winding of the transformer, and power is transferred to the secondary winding of the transformer. At this point, the voltage at the primary winding is equal to the input voltage. On the other hand, when the auxiliary switching element is turned on, the voltage at the other capacitor is applied to the primary winding of the transformer, and power is transferred to the secondary winding of the transformer. At this point, the voltage at the primary winding depends on the input voltage and the duty.

In an insulation type DC-DC converter for vehicle, the input voltage is supplied from a battery mounted on a vehicle, and the battery is also used as a power supply of a starter motor that starts an engine. Therefore, for example, when the engine is restarted by release of an idling stop state of the vehicle, a large current is passed through the starter motor, and a large drop in voltage is temporarily generated in the battery. The power for the controller that controls switching operation of the DC-DC converter is also supplied from the battery. Therefore, when the battery voltage is lower than a voltage necessary for operation of the controller, a CPU constituting the controller is reset, and the switching operation becomes uncontrollable.

For example, in Patent Literature 5, a tertiary winding is provided in the transformer of the DC-DC converter, a rectification circuit in which four diodes are bridge-connected to one another is connected to the tertiary winding, and an output voltage at the rectification circuit is smoothed and used as the power for a control circuit. However, in Patent Literature 5, a structure of the transformer becomes complicated because the tertiary winding is provided in the transformer.

There is also a method for obtaining the power for the controller from a boosted secondary-side output voltage. However, in this case, it is necessary that the power be supplied to the primary-side controller while the secondary-side output voltage is insulated. Therefore, it is necessary to provide an insulation circuit between the output terminal and the controller, and the configuration becomes complicated.

SUMMARY

An object of the disclosure is to be able to supply the necessary power to the controller of the voltage conversion device with a simple configuration even if the input voltage decreases.

According to one or more embodiments of the disclosure, a voltage conversion device includes a first conversion circuit configured to switch a DC voltage at a DC power supply to convert the DC voltage into an AC voltage, a second conversion circuit configured to rectify the AC voltage converted with the first conversion circuit to convert the AC voltage into a DC voltage, and a controller configured to control switching operation of the first conversion circuit. The first conversion circuit and the second conversion circuit are insulated from each other using a transformer. The first conversion circuit includes a main switching element, an auxiliary switching element, an input inductor, a primary winding of the transformer, a first capacitor, and a second capacitor. The input inductor and the main switching element are connected in series to the DC power supply. A series circuit of the primary winding and the second capacitor is connected in parallel to the main switching element. A series circuit of the first capacitor and the auxiliary switching element is connected in parallel to the primary winding. The second conversion circuit includes a secondary winding of the transformer and a rectifying element configured to rectify an AC voltage generated in the secondary winding. In one or more embodiments of the disclosure, the power supply circuit is also provided between a connection point of the auxiliary switching element and the first capacitor and the controller. The power supply circuit obtains the power supply voltage necessary for the operation of the controller from the voltage at the connection point, and supplies the power supply voltage to the controller.

As described later, the voltage at the connection point of the auxiliary switching element and the first capacitor is a voltage in which the voltage at the DC power supply is boosted. For this reason, even if the voltage at the DC power supply is lower than the power supply voltage necessary for the operation of the controller, the necessary voltage is supplied from the power supply circuit to the controller. Resultantly, the controller operates normally without being reset to continuously control the switching operation. It is not necessary to provide a tertiary winding in the transformer, or to provide an insulation circuit in the power supply circuit, which simplifies the configuration.

In one or more embodiments of the disclosure, the power supply voltage necessary for the operation of the controller may be supplied from the DC power supply to the controller in a normal state in which the DC voltage at the DC power supply does not decrease, and the power supply voltage necessary for the operation of the controller may be supplied from the power supply circuit to the controller in an emergency in which the DC voltage at the DC power supply decreases.

In one or more embodiments of the disclosure, the power supply circuit may includes a clamp circuit configured to clamp the voltage at the connection point at a predetermined level, and to output a voltage lower than the voltage at the connection point.

In one or more embodiments of the disclosure, the power supply circuit may further include a constant-voltage circuit configured to stabilize the output voltage at the clamp circuit.

In one or more embodiments of the disclosure, the voltage conversion device may further include a first diode provided between the DC power supply and the constant-voltage circuit; and a second diode provided between the clamp circuit and the constant-voltage circuit. At this point, an anode of the first diode is connected to a positive electrode of the DC power supply, an anode of the second diode is connected to an output terminal of the clamp circuit, and cathodes of the first diode and the second diode are connected to an input terminal of the constant-voltage circuit.

In one or more embodiments of the disclosure, the voltage conversion device may further include a drive circuit configured to output a drive signal to the main switching element and the auxiliary switching element to drive the main switching element and the auxiliary switching element based on a control signal output from the controller. At this point, the power supply circuit obtains the power supply voltage necessary for the operation of the drive circuit from the voltage at the connection point, and supplies the power supply voltage to the drive circuit.

In one or more embodiments of the disclosure, when a signal indicating release of an idling stop state of a vehicle is input, the controller may put the power supply circuit into an operating state, and receive the supply of the power supply voltage necessary for the operation of the controller from the power supply circuit.

In one or more embodiments of the disclosure, when detecting the power supply voltage supplied to the controller or the DC voltage at the DC power supply decreasing to a given value, the controller may put the power supply circuit into the operating state, and receive the supply of the power supply voltage necessary for the operation of the controller from the power supply circuit.

According to one or more embodiments of the disclosure, the necessary power can be supplied to the controller of the voltage conversion device with the simple configuration even if the input voltage decreases.

BRIEF DESCRIPTION OF THE DRAWINGS

FIG. 5A is a circuit diagram illustrating a current passage of a section A in a normal state;

FIG. 5B is a circuit diagram illustrating a current passage of a section B in the normal state;

FIG. 5C is a circuit diagram illustrating a current passage of a section C in the normal state;

FIG. 5D is a circuit diagram illustrating a current passage of a section D in the normal state;

FIG. 5E is a circuit diagram illustrating a current passage of a section E in the normal state;

FIG. 5F is a circuit diagram illustrating a current passage of a section F in the normal state;

DETAILED DESCRIPTION

Hereinafter, a voltage conversion device according to embodiments of the disclosure will be described with reference to the drawings. In each drawing, the identical or equivalent component is designated by the identical numeral. In embodiments of the disclosure, numerous specific details are set forth in order to provide a more through understanding of the invention. However, it will be apparent to one of ordinary skill in the art that the invention may be practiced without these specific details. In other instances, well-known features have not been described in detail to avoid obscuring the invention.

Figure 1:
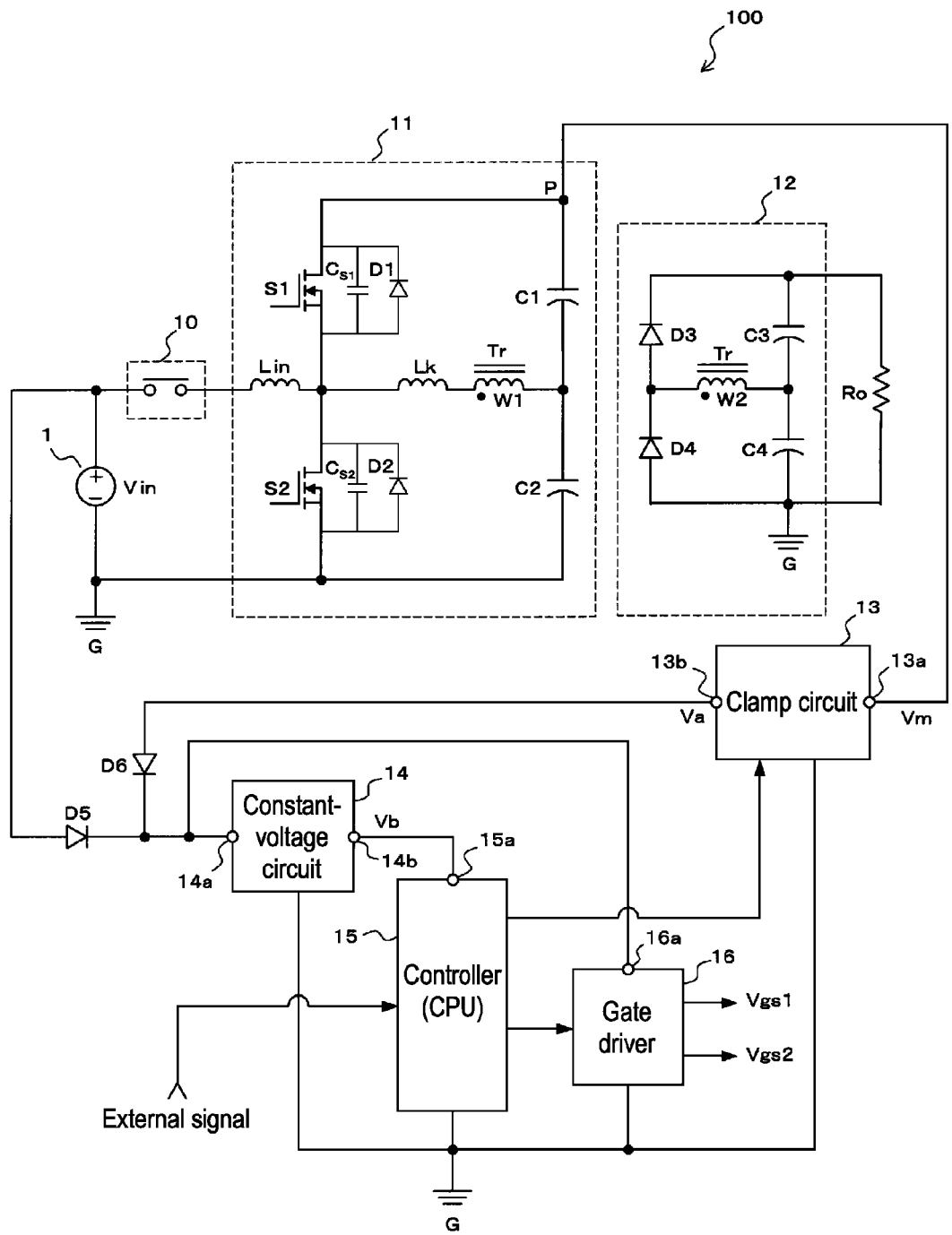
FIG. 1 is a circuit diagram illustrating a voltage conversion device according to one or more embodiments of the disclosure.

A configuration of a voltage conversion device will be described below with reference to FIG. 1. Referring to FIG. 1, a voltage conversion device 100 is the BHB system insulation type DC-DC converter, and includes a relay 10, a first conversion circuit 11, a second conversion circuit 12, a clamp circuit 13, a constant-voltage circuit 14, a controller 15, a gate driver 16, and diodes D5 and D6. The first conversion circuit 11 and the second conversion circuit 12 are insulated from each other using a transformer Tr. For example, the voltage conversion device 100 is mounted on a vehicle, and used as a DC-DC converter, which boosts a battery voltage and supplies the boosted voltage to a load such as on-board equipment.

The relay 10 is connected between a positive electrode of a DC power supply 1 and the first conversion circuit 11. A negative electrode of the DC power supply 1 is connected to a grounding G. The controller 15 controls operation of the relay 10.

The first conversion circuit 11 performs the switching of a DC voltage at the DC power supply 1, and converts the DC voltage into an AC voltage while boosting the DC voltage. The first conversion circuit 11 includes an auxiliary switching element S1, a main switching element S2, an input inductor Lin, a primary winding W1 of the transformer Tr, and capacitors C1 and C2. Each of the auxiliary and main switching elements S1 and S2 is constructed with a field effect transistor (FET). The capacitor C1 corresponds to a "first capacitor" in one or more embodiments of the disclosure, and the capacitor C2 corresponds to a "second capacitor" in one or more embodiments of the disclosure. A circuit configuration of the first conversion circuit 11 is identical to that in FIG. 2.1 of Non Patent Literature 3.

A source of the auxiliary switching element S1 is connected to a drain of the main switching element S2, and the input inductor Lin is connected between a connection point of the source of the auxiliary switching element S1 and the drain of the main switching element S2 and the relay 10.

A parallel circuit of a parasitic capacitor Cs1 and a parasitic diode D1 is equivalently connected between the drain and source of the auxiliary switching element S1. Similarly, a parallel circuit of a parasitic capacitor Cs2 and a parasitic diode D2 is equivalently connected between the drain and source of the main switching element S2. A leakage inductance Lk is equivalently connected in series to the primary winding W1 of the transformer Tr.

The drain of the auxiliary switching element S1 is connected to one end of the capacitor C1, and the other end of the capacitor C1 is connected to one end of the capacitor C2. The other end of the capacitor C2 is connected to the grounding G. A series circuit of the primary winding W1 of the transformer Tr and the leakage inductance Lk is connected between the connection point of the capacitors C1 and C2 and the connection point of the auxiliary and main switching elements S1 and S2.

Resultantly, in the first conversion circuit 11, the input inductor Lin and the main switching element S2 are connected in series to the DC power supply 1, the series circuit of the primary winding W1 and the capacitor C2 is connected in parallel to the main switching element S2, and the series circuit of the capacitor C1 and the auxiliary switching element S1 is connected in parallel to the primary winding W1.

The second conversion circuit 12 rectifies the AC voltage boosted with the first conversion circuit 11, and converts the AC voltage into the DC voltage. The second conversion circuit 12 includes a secondary winding W2 of the transformer Tr, diodes D3 and D4 that rectify the AC voltage generated in the secondary winding W2, and capacitors C3 and C4 that smooth the rectified voltage. The diodes D3 and D4 are an example of a "rectifying element" in one or more embodiments of the disclosure. A circuit configuration of the second conversion circuit 12 is also identical to that in FIG. 2.1 of Non Patent Literature 3.

A cathode of the diode D3 is connected one end of the capacitor C3, and an anode of the diode D3 is connected to a cathode of the diode D4. An anode of the diode D4 is connected to the grounding G. The other end of the capacitor C3 is connected to one end of the capacitor C4, and the other end of the capacitor C4 is connected to the grounding G. The secondary winding W2 of the transformer Tr is connected between the connection point of the diodes D3 and D4 and the connection point of the capacitors C3 and C4. A load Ro is connected between the connection point of the diode D3 and capacitor C3 and the grounding G.

In the first conversion circuit 11, the clamp circuit 13 and the constant-voltage circuit 14 are provided between a connection point P of the auxiliary switching element S1 and the capacitor C1 and a power terminal 15a of the controller 15. The clamp circuit 13 and the constant-voltage circuit 14 constitute an emergency power supply circuit. In an emergency in which an input voltage Vin at the DC power supply 1 decreases, the emergency power supply circuit obtains a power supply voltage Vb necessary for operation of the controller 15 from a voltage Vm at the connection point P, and supplies the power supply voltage Vb to the controller 15 (details will be described later).

The clamp circuit 13 clamps the voltage Vm at the connection point P input to an input terminal 13a at a predetermined level, and outputs an output voltage Va lower than the voltage Vm from an output terminal 13b. Because a publicly known circuit can be used as the clamp circuit 13, the detailed description is omitted. The constant-voltage circuit 14 stabilizes the output voltage Va at the clamp circuit 13 input to an input terminal 14a, and outputs a constant voltage Vb from an output terminal 14b. The constant voltage Vb is the power supply voltage necessary for the operation of the controller 15. Because a publicly known circuit can be used as the constant-voltage circuit 14, the detailed description is omitted.

The controller 15 is constituted of a CPU, and controls the switching operation of the first conversion circuit 11. Specifically, the controller 15 provides a control signal to the gate driver 16 to control turn-on and turn-off of the auxiliary switching element S1 and the main switching element S2. As described later, the controller 15 controls the operation of the clamp circuit 13. An external signal is input from an in-vehicle electronic control unit (ECU) to the controller 15, and the controller 15 performs predetermined control operation based on the external signal. The power terminal 15a of the controller 15 is connected to the output terminal 14b of the constant-voltage circuit 14.

Based on the control signal from the controller 15, the gate driver 16 generates gate signals Vgs1 and Vgs2 to turn on and off the auxiliary and main switching elements S1 and S2. The gate signal Vgs1 is provided to a gate of the auxiliary switching element S1, and the gate signal Vgs2 is provided to a gate of the main switching element S2. A power terminal 16a of the gate driver 16 is connected to the input terminal 14a of the constant-voltage circuit 14. The gate driver 16 is an example of a "drive circuit" in one or more embodiments of the disclosure, and the gate signals Vgs1 and Vgs2 are an example of a "drive signal" in one or more embodiments of the disclosure.

The diode D5 is provided between the DC power supply 1 and the constant-voltage circuit 14, and the diode D6 is provided between the clamp circuit 13 and the constant-voltage circuit 14. Specifically, an anode of the diode D5 is connected to a positive electrode of the DC power supply 1, and an anode of the diode D6 is connected to the output terminal 13b of the clamp circuit 13. Cathodes of the diodes D5 and D6 are connected to the input terminal 14a of the constant-voltage circuit 14. The diode D5 corresponds to a "first diode" in one or more embodiments of the disclosure, and the diode D6 corresponds to a "second diode" in one or more embodiments of the disclosure.

Figure 2:
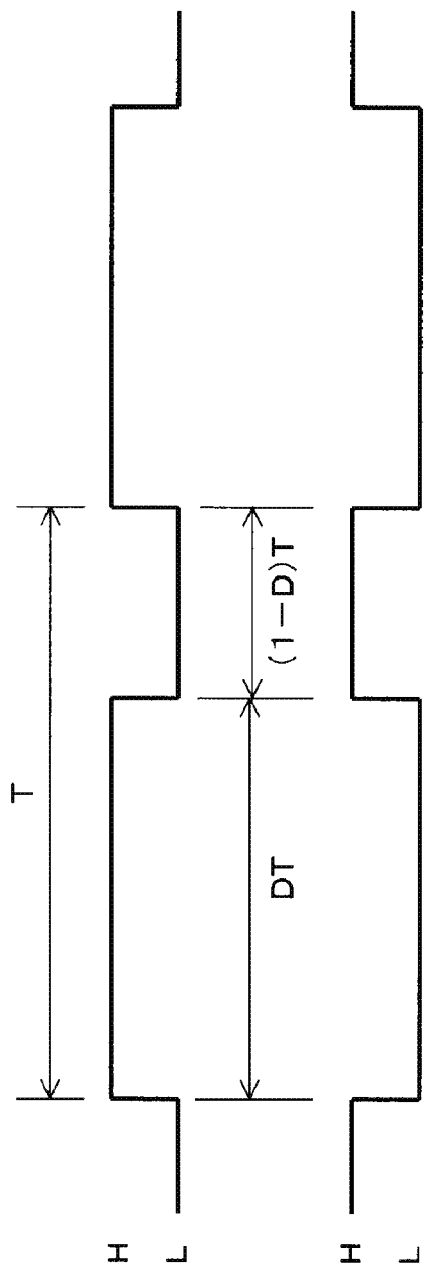
FIGS. 2A and 2B are diagrams illustrating gate signals of a main switching element S2 and an auxiliary switching element S1.

FIG. 2 illustrates an example of the gate signal output from the gate driver 16. In FIG. 2, (a) illustrates the gate signal Vgs2 applied to the gate of the main switching element S2, and (b) illustrates the gate signal Vgs1 applied to the gate of the auxiliary switching element S1. The gate signals Vgs1 and Vgs2 are a pulse width modulation (PWM) signal having a predetermined duty. T expresses a period of the gate signal and D expresses a duty. The auxiliary and main switching elements S1 and S2 are turned on when the gate signals Vgs1 and Vgs2 are in an H (High)-level section, and the auxiliary and main switching elements S1 and S2 are turned off when the gate signals are in an L (Low)-level section. As described above, the auxiliary and main switching elements S1 and S2 are alternately turned on, and one of the auxiliary and main switching elements S1 and S2 is turned off when the other is turned on (although actually a dead time section is provided such that the auxiliary and main switching elements S1 and S2 are not simultaneously put into the on state, the dead time section is not illustrated in FIG. 2).

The operation of the voltage conversion device 100 described above is as follows. The relay 10 is turned on, and the gate driver 16 applies the gate signals Vgs1 and Vgs2 to the gates of the auxiliary and main switching elements S1 and S2, whereby the voltage conversion device 100 starts the operation. When the auxiliary switching element S1 is turned off while the main switching element S2 is turned on, the DC power supply 1 accumulates energy in the input inductor Lin. The accumulated energy depends on the duty D of the main switching element S2. The voltage at the capacitor C2 is applied to the primary winding W1 of the transformer Tr, and is transferred to the secondary winding W2, and power is supplied to the load Ro. At this point, the voltage at the capacitor C2 is substantially equal to the voltage at the DC power supply 1.

When the main switching element S2 is turned off, boost operation is started, and the capacitors C1 and C2 are charged through the parasitic diode D1 with the energy accumulated in the input inductor Lin. Then, the voltage at the capacitor C1 is applied to the primary winding W1 of the transformer Tr by the turn-on of the auxiliary switching element S1, the boosted voltage is transferred to the secondary winding W2, and the power is supplied to the load Ro. At this point, the voltage at the capacitor C1 depends on the voltage at the DC power supply 1 and the duty D.

Figure 3:
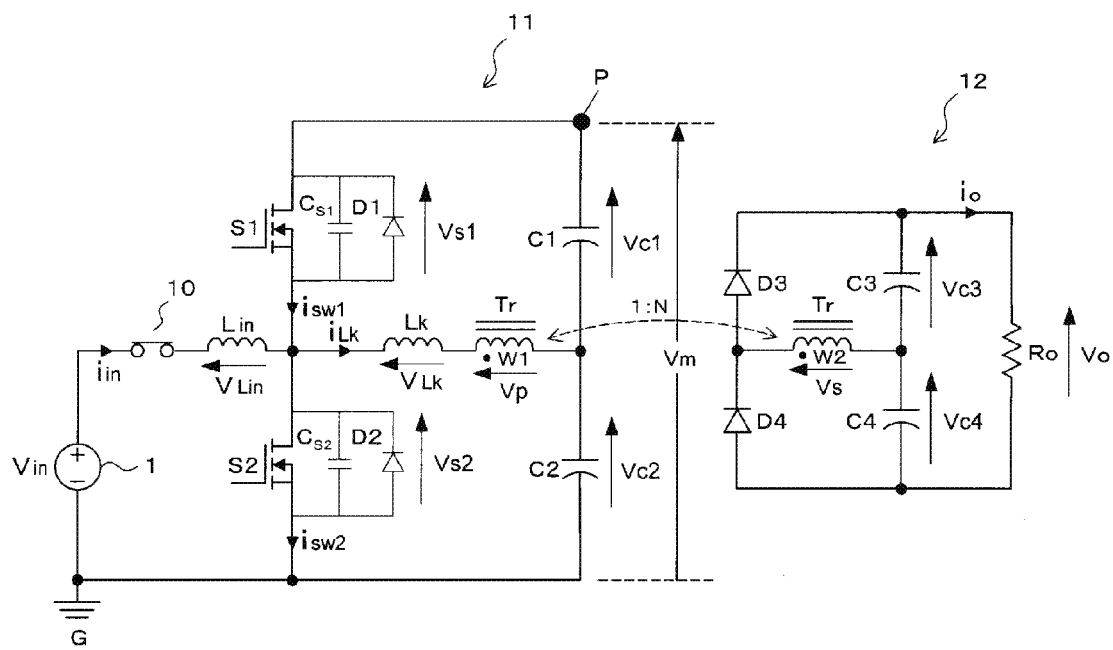
FIG. 3 is a diagram illustrating voltage and current of each unit of the voltage conversion device.

FIG. 3 illustrates voltage and current of each unit of the voltage conversion device 100. A stage subsequent to the connection point P in FIG. 1 is not illustrated in FIG. 3. FIG. 3 is basically identical to FIG. 2.1 of Non Patent Literature 3, and a definition of each numeral in FIG. 3 is as follows.

Vin: input voltage (voltage at DC power supply 1)
Vo: output voltage
Vs1: both-end voltage at auxiliary switching element S1
Vs2: both-end voltage at main switching element S2
Vc1: both-end voltage at capacitor C1
Vc2: both-end voltage at capacitor C2
Vc3: both-end voltage at capacitor C3
Vc4: both-end voltage at capacitor C4
Vm: voltage at connection point P
Vp: both-end voltage at primary winding W1 of transformer Tr
Vs: both-end voltage at secondary winding W2 of transformer Tr
$V_{Lin}$: both-end voltage at input inductor Lin
$V_{LK}$: both-end voltage at leakage inductance Lk
$i_{in}$: input current
$i_o$: output current
$i_{SW1}$: current passed through auxiliary switching element S1
$i_{SW2}$: current passed through main switching element S2
$i_{LK}$: current passed through leakage inductance Lk In a normal state in which the relay 10 is turned on to operate the circuit, the voltages Vc1, Vc2, Vm, Vc3, Vc4, and Vo can be calculated by the following equations as illustrated in FIG. 3. Where D is the duty in FIG. 2 and N is a turns ratio of the transformer Tr.

$$Vc1=[D/(1-D)]\cdot Vin$$

$$Vc2=Vin$$

$$Vm=Vc1+Vc2=[1/(1-D)]\cdot Vin \quad (1)$$

$$Vc3=Vc1\cdot N=[D/(1-D)]\cdot Vin\cdot N$$

$$Vc4=Vc2\cdot N=Vin\cdot N$$

$$Vo=Vc3+Vc4=[1/(1-D)]\cdot Vin\cdot N$$

As can be seen from the above equation (1), the voltage Vm at the connection point P depends on the input voltage Vin and the duty D. In the case that the duty D is in a range of 0<D<1, Vm>Vin is obtained, and the voltage Vm higher than the input voltage Vin is generated at the connection point P. That is, the voltage Vm at the connection point P is a voltage in which the input voltage Vin is boosted. The present disclosure focuses on this point, and obtains the power supply voltage necessary for the operation of the controller 15 from the boosted voltage Vm at the connection point P such that the operation of the controller 15 is not interrupted even if the input voltage Vin decreases (details will be described later).

Figure 4:
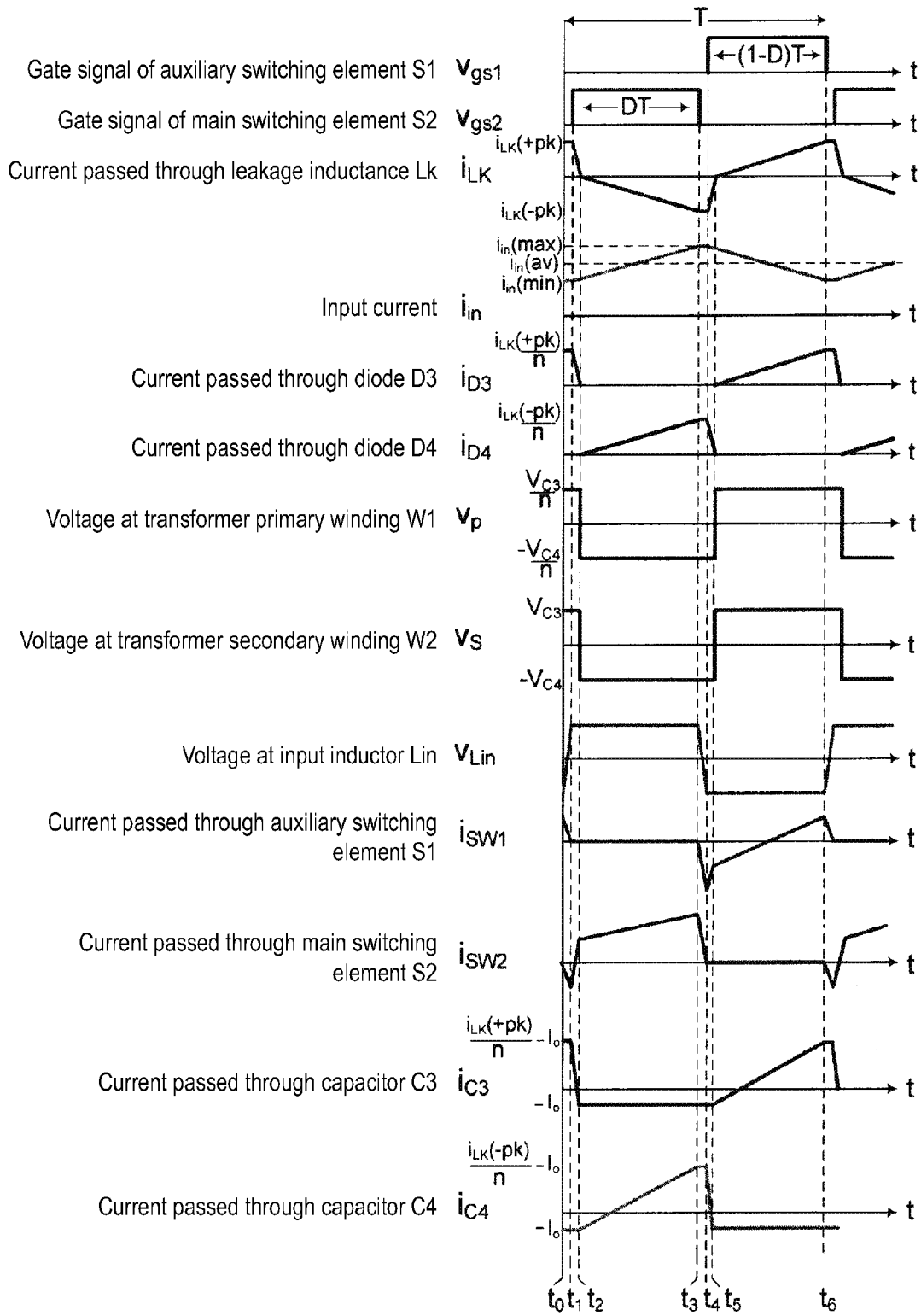
FIG. 4 is a waveform chart illustrating voltage and current of each unit of the voltage conversion device.

FIG. 4 illustrates waveforms for one period of the voltage and current with respect to each unit in FIG. 3. FIG. 2.2 of Non Patent Literature 3 is quoted to FIG. 4. In a horizontal axis, t0 to t6 express the following timings. t0 is the timing immediately after the auxiliary switching element S1 is turned off. t1 is the timing the gate signal Vgs2 of the main switching element S2 rises (becomes H from L). t2 is the timing the main switching element S2 is turned on by the gate signal Vgs2. t3 is the timing the gate signal Vgs2 of the main switching element S2 falls (becomes L from H). t4 is the timing the gate signal Vgs1 of the auxiliary switching element S1 rises (becomes H from L). t5 is the timing the auxiliary switching element S1 is turned on by the gate signal Vgs1. t6 is the timing the gate signal Vgs1 of the auxiliary switching element S1 falls (becomes L from H).

FIG. 5A to FIG. 5F illustrate current passages of the first conversion circuit 11 and second conversion circuit 12 at a given section in one period. The waveform chart below each drawing is partially extracted from the waveform chart in FIG. 4 in order to display sections A to F.

FIG. 5A illustrates the current passage at the section A (t0 to t1). At the section A, both the auxiliary and main switching elements S1 and S2 are in the off state. In the first conversion circuit 11, at the same time as the auxiliary switching element S1 is turned off, the charge of the parasitic capacitor Cs1 is started and a voltage Vs1 increases to Vc1+Vc2. On the other hand, the parasitic capacitor Cs2 of the main switching element S2 discharges and a voltage Vs2 decreases to zero. An input current $i_{in}$ becomes a minimum value, and a leakage inductance current $i_{LK}$ becomes a positive peak value. In the second conversion circuit 12, a current $i_{D3}$ passed through the diode D3 remains passed.

FIG. 5B illustrates the current passage at the section B (t1 to t2). At the section B, the auxiliary switching element S1 is maintained in the off state, and the main switching element S2 is in the state immediately before the turn-on. In the first conversion circuit 11, the parasitic diode D2 becomes conductive at the timing t1. The main switching element S2 is not turned on until the current passed through the parasitic diode D2 becomes zero. The increase in the input current $i_{in}$ starts from the minimum value, and the leakage inductance current $i_{LK}$ decreases to zero. In the second conversion circuit 12, the current $i_{D3}$ passed through the diode D3 decreases to zero.

FIG. 5C illustrates the current passage at the section C (t2 to t3). At the section C, the main switching element S2 is turned on, and the auxiliary switching element S1 is maintained in the off state. In the first conversion circuit 11, the voltage Vc2 at the capacitor C2 is applied to both ends of the series circuit of the primary winding W1 and leakage inductance Lk, and a polarity of the voltage Vp at the primary winding W1 is inverted from positive to negative (see FIG. 4). The increase in the input current $i_{in}$ is continued, and the increase in the leakage inductance current $i_{LK}$ starts from zero toward a negative direction. In the second conversion circuit 12, the diode D4 becomes conductive, and the passage of a current $i_{D4}$ through the diode D4 starts. The polarity of the voltage Vs at the secondary winding W2 is inverted from positive to negative (see FIG. 4).

FIG. 5D illustrates the current passage at the section D (t3 to t4). At the section D, the auxiliary switching element S1 is maintained in the off state, and the main switching element S2 is turned off. In the first conversion circuit 11, the parasitic capacitor Cs2 charges until Vs2=Vc1+Vc2, and the parasitic capacitor Cs1 discharges until Vs1=0. The input current $i_{in}$ becomes a maximum value, and the leakage inductance current $i_{LK}$ becomes a negative peak value. In the second conversion circuit 12, the current $i_{D4}$ is continuously passed through the diode D4.

FIG. 5E illustrates the current passage at the section E (t4 to t5). At the section E, the main switching element S2 is maintained in the off state, and the auxiliary switching element S1 is in the state immediately before the turn-on. In the first conversion circuit 11, the passage of the current through the parasitic diode D1 is started at the same time as the discharge of the parasitic capacitor Cs1 is ended. The auxiliary switching element S1 is not turned on until the current passed through the parasitic diode D1 becomes zero. The decrease in the input current $i_{in}$ starts from the maximum value, and the leakage inductance current $i_{LK}$ decreases from the negative peak value to zero. In the second conversion circuit 12, the current $i_{D4}$ passed through the diode D4 decreases to zero.

FIG. 5F illustrates the current passage at the section F (t5 to t6). At the section F, the auxiliary switching element S1 is turned on, and the main switching element S2 is maintained in the off state. In the first conversion circuit 11, the input current $i_{in}$ decreases to the minimum value, and the leakage inductance current $i_{LK}$ increases from zero to the positive peak value. In the second conversion circuit 12, the diode D3 becomes conductive, and the current $i_{D3}$ is passed through the diode D3. When the auxiliary switching element S1 is turned off at the timing t6, the waveform chart returns to FIG. 5A, and the next period starts.

The supply of the power to the controller 15 and gate driver 16 will be described below with reference to FIGS. 6 and 7.

<Normal Power Supply>

Figure 6:
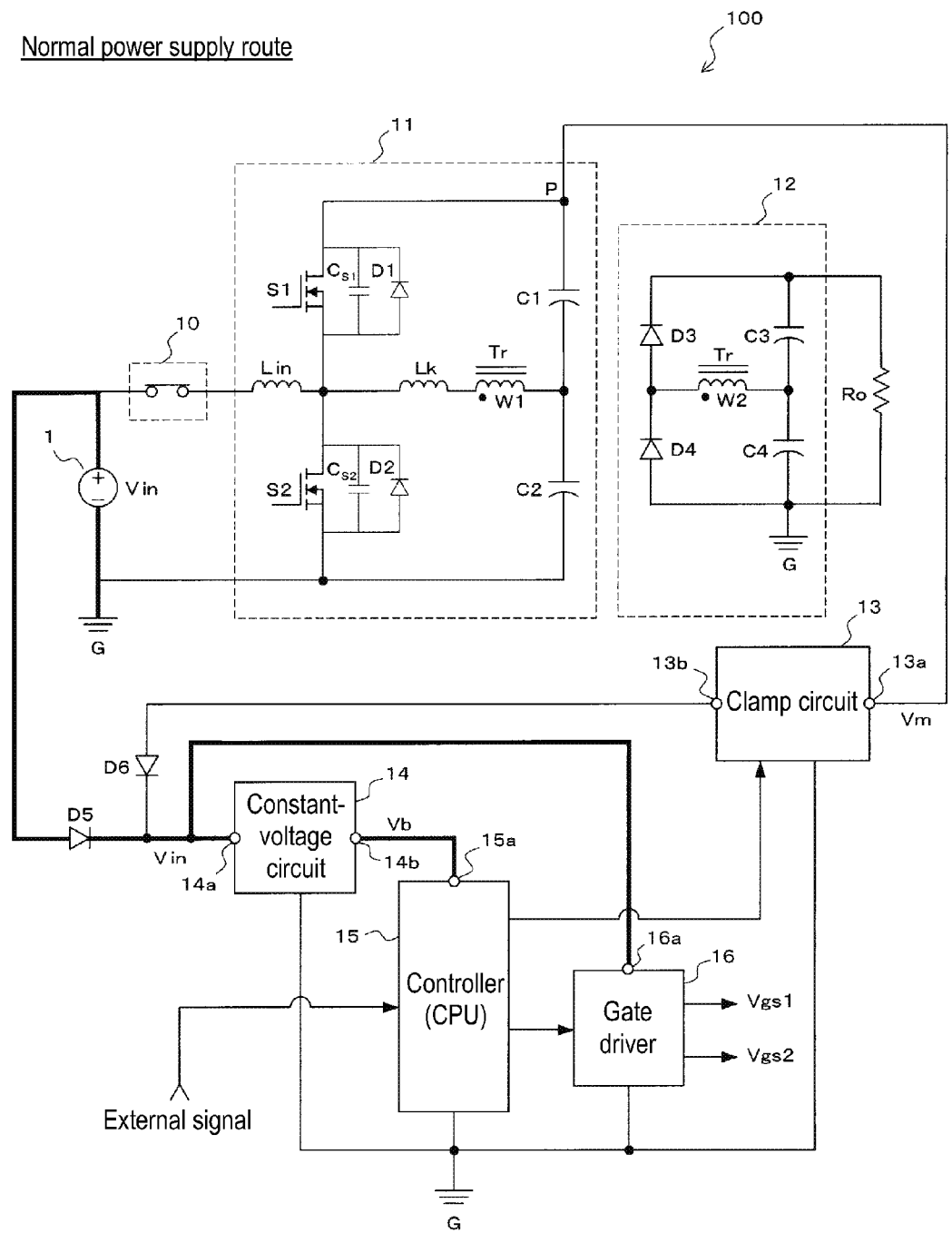
FIG. 6 is a circuit diagram illustrating a normal power supply route.

FIG. 6 illustrates a normal power supply route (bold line) when the input voltage Vin at the DC power supply 1 does not decreases. In this case, the clamp circuit 13 stops the operation, and the voltage is not supplied to the output terminal 13b of the clamp circuit 13. On the other hand, the constant-voltage circuit 14 is in the operating state.

In the state of FIG. 6, the input voltage Vin at the DC power supply 1 is applied to the input terminal 14a of the constant-voltage circuit 14 through the diode D5. The constant-voltage circuit 14 stabilizes the input voltage Vin, generates the power supply voltage Vb necessary for the operation of the controller 15, and provides the power supply voltage Vb to the power terminal 15a of the controller 15. The input voltage Vin at the DC power supply 1 is applied to the power terminal 16a of the gate driver 16 through the diode D5 as the power supply voltage necessary for the operation of the gate driver 16.

Thus, in the normal state, the power supply voltage necessary for the operation of the controller 15 is supplied from the DC power supply 1 to the controller 15 through the constant-voltage circuit 14. Additionally, the power supply voltage necessary for the operation of the gate driver 16 is supplied from the DC power supply 1 to the gate driver 16 not via the constant-voltage circuit 14.

<Power Supply in Emergency (During Decrease in Input Voltage)>

Figure 7:
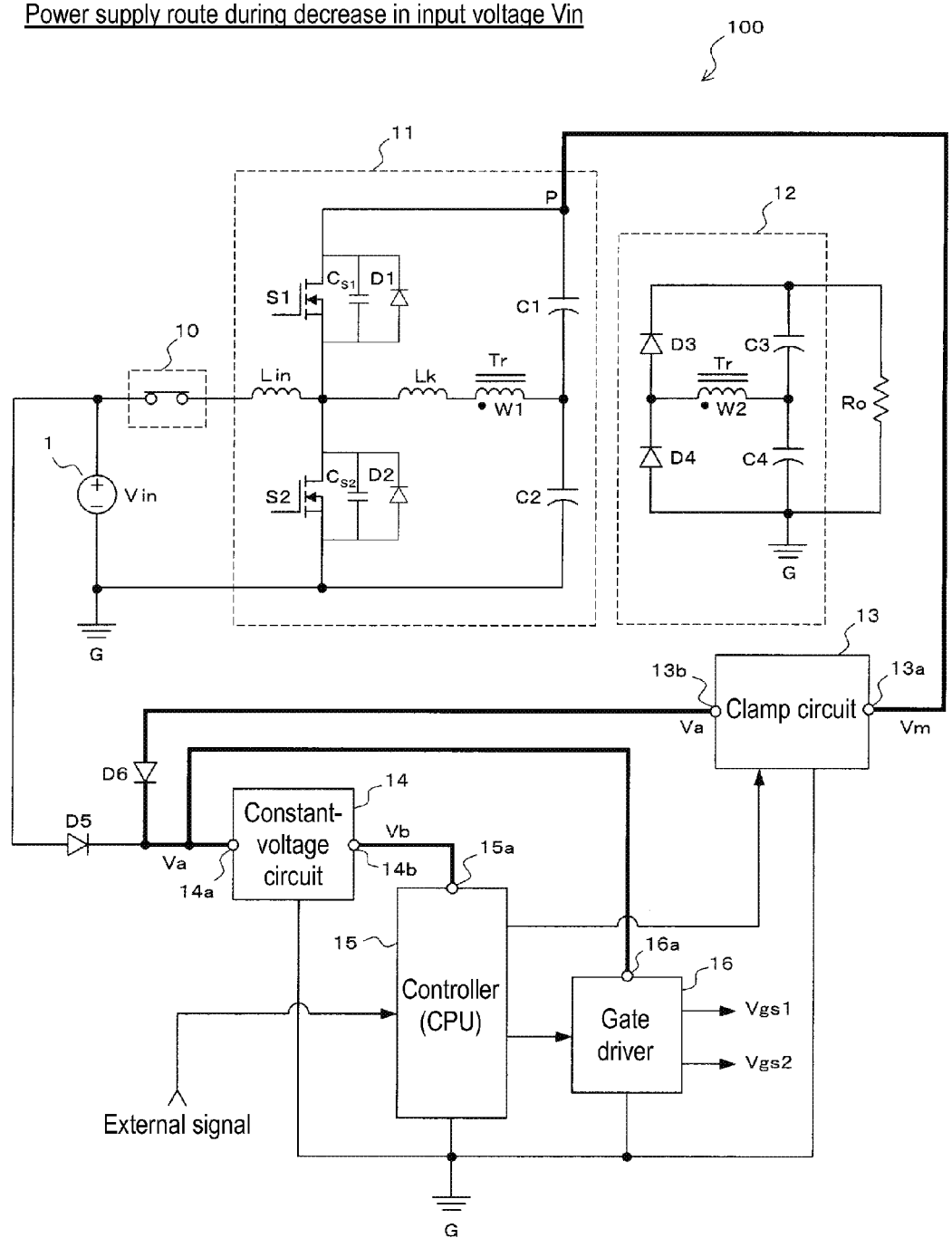
FIG. 7 is a circuit diagram illustrating a power supply route when an input voltage decreases.

FIG. 7 illustrates a power supply route (bold line) in an emergency in which the input voltage Vin at the DC power supply 1 decreases. As described above, when a starter motor for starting an engine is started up from an idling stop state, the input voltage Vin decreases largely, and sometimes the input voltage Vin is lower than the power supply voltage necessary for the operation of the controller 15. Therefore, the CPU constituting the controller 15 is reset, and the switching operation is not controlled.

For this reason, the controller 15 puts the clamp circuit 13 into the operating state when an idling stop release signal is input as the external signal. The clamp circuit 13 clamps the voltage Vm at the connection point P input to the input terminal 13a at a predetermined level, and outputs the output voltage Va (Va<Vm) lower than the voltage Vm from the output terminal 13b. The output voltage Va is provided to the input terminal 14a of the constant-voltage circuit 14 through the diode D6. When the decrease in the input voltage Vin leads to Vin<Va, the diode D5 becomes a reverse bias, and the input voltage Vin is not applied to the input terminal 14a of the constant-voltage circuit 14. The constant-voltage circuit 14 stabilizes the output voltage Va input to the input terminal 14a, and outputs the power supply voltage Vb necessary for the operation of the controller 15 from the output terminal 14b. The power supply voltage Vb is provided to the power terminal 15a of the controller 15.

In releasing the idling stop, the power supply voltage Vb necessary for the operation of the controller 15 is obtained from the voltage Vm at the connection point P. As described above, the voltage Vm at the connection point P is higher than the input voltage Vin at the DC power supply 1 (Vin<Vm). Therefore, the clamp circuit 13 and the constant-voltage circuit 14, which constitute the power supply circuit, supply the power supply voltage Vb necessary for the operation to the controller 15 even if the input voltage Vin decreases by the start-up of the starter motor. The controller 15 can continuously control the auxiliary and main switching elements S1 and S2 without being reset.

The output voltage Va output from the clamp circuit 13 is also provided to the power terminal 16a of the gate driver 16 through the diode D6. That is, the power supply voltage necessary for the operation of the gate driver 16 is also obtained from the voltage Vm at the connection point P. Even if the input voltage Vin decreases in releasing the idling stop, the gate driver 16 can continuously drive the auxiliary and main switching elements S1 and S2 without becoming inoperable.

According to an illustrative embodiment, in an emergency in which the input voltage Vin at the DC power supply 1 decreases, the power supply voltage Vb necessary for the operation of the controller 15 and the power supply voltage Va necessary for the operation of the gate driver 16 are obtained from the boosted voltage Vm at the connection point P, and supplied to the controller 15 and the gate driver 16. Even if the input voltage Vin at the DC power supply 1 is lower than the power supply voltage necessary for the operation of the controller 15 or gate driver 16 due to the release of the idling stop, the controller 15 or gate driver 16 operates normally, and the switching operation of each of the auxiliary and main switching elements S1 and S2 can continuously be performed.

According to an illustrative embodiment, it is not necessary to provide a tertiary winding in the transformer Tr unlike Patent Literature 5. Therefore, the complicated structure of the transformer Tr can be avoided. Additionally, the power supply voltage necessary for the operation of the controller 15 or gate driver 16 is obtained from not the secondary-side second conversion circuit 12 but the primary-side first conversion circuit 11. Therefore, it is not necessary to provide an insulation circuit in the power supply circuit, so that the configuration is simplified.

Figure 8:
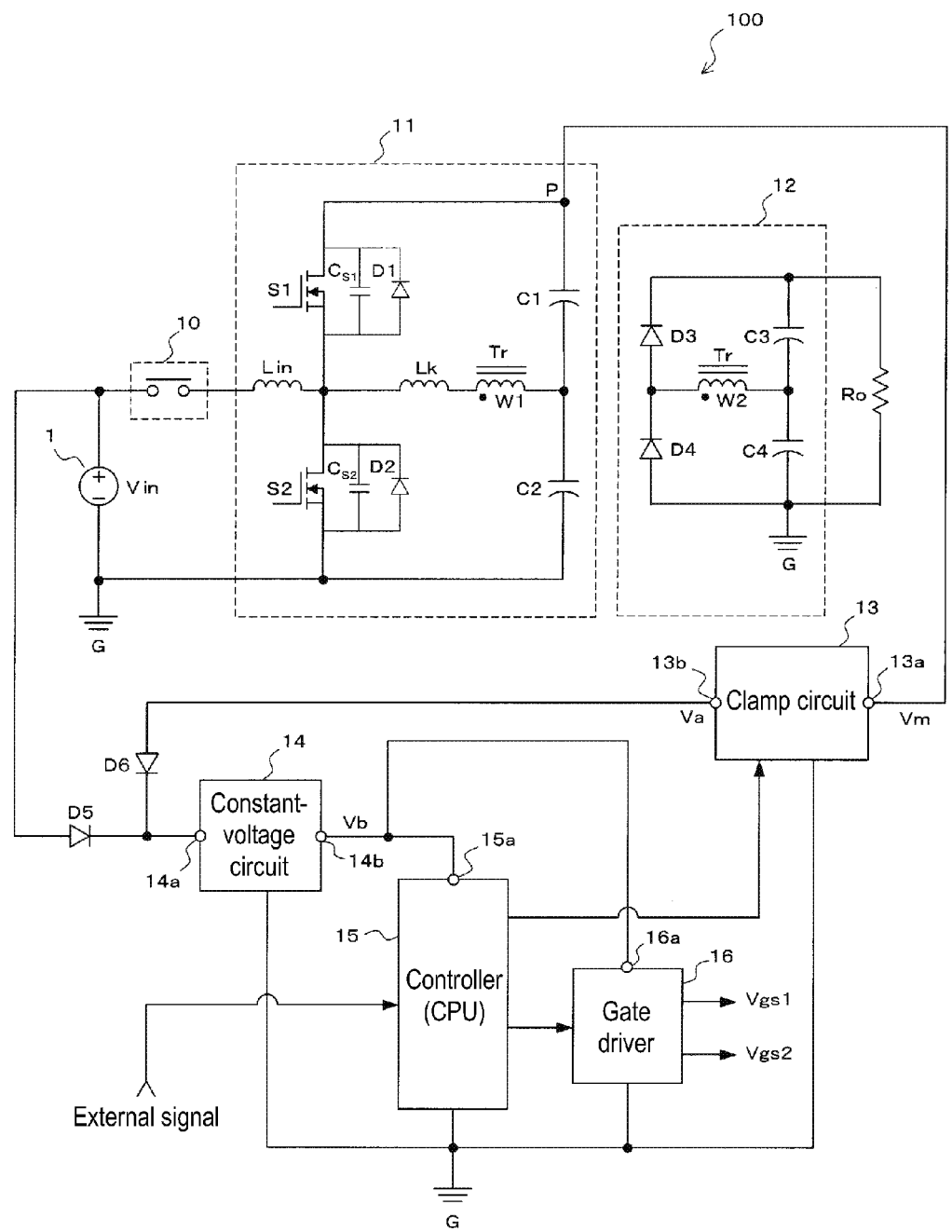
FIG. 8 is a circuit diagram illustrating a voltage conversion device according to one or more embodiments of the disclosure.

FIG. 8 illustrates a voltage conversion device 100 according to another embodiment. In the voltage conversion device 100 of FIG. 1, the power terminal 16a of the gate driver 16 is connected to the input terminal 14a of the constant-voltage circuit 14. On the other hand, in the voltage conversion device 100 of FIG. 8, the power terminal 16a of the gate driver 16 is connected to the output terminal 14b of the constant-voltage circuit 14. Accordingly, the power supply voltage necessary for the operation of the gate driver 16 is supplied from the constant-voltage circuit 14. Because other configurations are similar to those in FIG. 1, the overlapping description is omitted. The effect similar to that of the embodiment in FIG. 1 is obtained in another embodiment in FIG. 8.

The voltage conversion devices 100 in FIGS. 1 and 8 are the DC-DC converter. Alternatively, the voltage conversion device in one or more embodiments of the disclosure may be a DC-AC converter described in Non Patent Literature 1. In this case, a third conversion circuit (not illustrated) that converts the DC voltage obtained with the second conversion circuit 12 into the AC voltage by switching of the DC voltage is provided at a stage subsequent to the second conversion circuit 12.

In FIGS. 1 and 8, the single-phase voltage conversion device in which only one set of the auxiliary and main switching elements S1 and S2 is provided is described by way of example. Alternatively, the voltage conversion device in one or more embodiments of the disclosure may be a multi-phase voltage conversion device in which plural sets of auxiliary and main switching elements S1 and S2 are connected in parallel to each other. The multi-phase voltage conversion device is described in U.S. Patent Publication No. 2012/0163035 (Patent Literature 12) or Changwoo Yoon, Sewan choi "Multi-Phase DC-DC converters using a Boost Half Bridge Cell for High Voltage and High Power Applications" IEEE proceedings, 2006, pp. 780-786 (Non Patent Literature 5). In this case, the power supply voltage necessary for the operation of the controller or gate driver may be obtained from the connection point of the plural auxiliary switching elements and the first capacitor.

In addition to the above embodiments, various embodiments can be made in the disclosure.

In the second conversion circuit 12 of the voltage conversion device 100, a center tap is provided in the secondary winding W2 of the transformer Tr instead of the configurations in FIGS. 1 and 8, and a secondary-side circuit may be configured as disclosed in Patent Literatures 2-10.

In illustrative embodiments, the clamp circuit 13 that clamps the voltage Vm at the connection point P at a predetermined level is provided by way of example. Alternatively, a step-down circuit that performs step-down of the voltage Vm at the connection point P may be provided instead of the clamp circuit.

In illustrative embodiments, the clamp circuit 13 is put into the operating state when the signal indicating the release of the idling stop is input to the controller 15. Alternatively, the clamp circuit 13 may be put into the operating state when the controller 15 detects the power supply voltage Vb supplied to the controller 15 decreasing to a given value. Alternatively, the clamp circuit 13 may be put into the operating state when the controller 15 detects the input voltage Vin at the DC power supply 1 decreasing to a given value.

In illustrative embodiments, the power supply voltage necessary for the operation of the controller 15 and the gate driver 16 is supplied from the DC power supply 1 in the normal state, and supplied from the connection point P in an emergency (during the decrease in the input voltage). However, unless a loss is considered in the first conversion circuit 11 or the clamp circuit 13, the power supply voltage necessary for the operation of the controller 15 and the gate driver 16 may be supplied from the connection point P in the normal state.

In illustrative embodiments, the diodes D3 and D4 are used as the rectifying elements of the second conversion circuits 12. Alternatively, an FET may be used instead of the diode.

In illustrative embodiments, the FETs are used as the auxiliary and main switching elements S1 and S2. Alternatively, a transistor or an IGBT may be used instead of the FET.

In illustrative embodiments, the relay 10 is provided between the DC power supply 1 and the first conversion circuit 11. Alternatively, a switch, an FET, or a transistor may be used instead of the relay 10.

In illustrative embodiments, the auxiliary and main switching elements S1 and S2 are driven using the PWM signal. Alternatively, the auxiliary and main switching elements S1 and S2 may be driven using a signal except for the PWM signal.

In illustrative embodiments, the voltage conversion device mounted on the vehicle is cited by way of example. However, one or more embodiments of the disclosure are also applicable to a voltage conversion device for any objects in addition to the vehicle.

While the invention has been described with reference to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A voltage conversion device comprising:
   a first conversion circuit configured to switch a DC voltage at a DC power supply to convert the DC voltage into an AC voltage;
   a second conversion circuit configured to rectify the AC voltage converted with the first conversion circuit to convert the AC voltage into a DC voltage;
   a controller configured to control switching operation of the first conversion circuit,
   the first conversion circuit and the second conversion circuit being insulated from each other using a transformer,
   the first conversion circuit comprising a main switching element, an auxiliary switching element, an input inductor, a primary winding of the transformer, a first capacitor, and a second capacitor,
   the input inductor and the main switching element being connected in series to the DC power supply,
   a series circuit of the primary winding and the second capacitor being connected in parallel to the main switching element,
   a series circuit of the first capacitor and the auxiliary switching element being connected in parallel to the primary winding,
   the second conversion circuit comprising a secondary winding of the transformer and a rectifying element configured to rectify an AC voltage generated in the secondary winding; and
   a power supply circuit provided between a connection point of the auxiliary switching element and the first capacitor and the controller,
   wherein the power supply circuit obtains a power supply voltage necessary for operation of the controller from the voltage at the connection point, and supplies the power supply voltage to the controller,
   wherein the power supply voltage necessary for the operation of the controller is supplied from the DC power supply to the controller in a normal state in which the DC voltage at the DC power supply does not decrease, and
   wherein the power supply voltage necessary for the operation of the controller is supplied from the power supply circuit to the controller in an emergency state in which the DC voltage at the DC power supply decreases.

2. The voltage conversion device according to claim 1, wherein the power supply circuit comprises a clamp circuit configured to clamp the voltage at the connection point at a predetermined level, and to output a voltage lower than the voltage at the connection point.

3. The voltage conversion device according to claim 2, wherein the power supply circuit further comprises a constant-voltage circuit configured to stabilize the output voltage at the clamp circuit.

4. The voltage conversion device according to claim 3, further comprising
   a first diode provided between the DC power supply and the constant-voltage circuit; and
   a second diode provided between the clamp circuit and the constant-voltage circuit,
   wherein an anode of the first diode is connected to a positive electrode of the DC power supply,
   wherein an anode of the second diode is connected to an output terminal of the clamp circuit, and
   wherein cathodes of the first diode and the second diode are connected to an input terminal of the constant-voltage circuit.

5. The voltage conversion device according to claim 1, further comprising
   a drive circuit configured to output a drive signal to the main switching element and the auxiliary switching element to drive the main switching element and the auxiliary switching element based on a control signal output from the controller,
   wherein the power supply circuit obtains the power supply voltage necessary for operation of the drive circuit from the voltage at the connection point, and supplies the power supply voltage to the drive circuit.

6. The voltage conversion device according to claim 1, wherein, when a signal indicating release of an idling stop state of a vehicle is input, the controller puts the power supply circuit into an operating state, and receives the supply of the power supply voltage necessary for the operation of the controller from the power supply circuit.

7. The voltage conversion device according to claim 1, wherein, when detecting the power supply voltage supplied to the controller or the DC voltage at the DC power supply decreasing to a given value, the controller puts the power supply circuit into an operating state, and receives the supply of the power supply voltage necessary for the operation of the controller from the power supply circuit.

* * * * *